United States Patent
Andrews et al.

(10) Patent No.: US 11,676,183 B1
(45) Date of Patent: Jun. 13, 2023

(54) TRANSLATOR-BASED SCORING AND BENCHMARKING FOR USER EXPERIENCE TESTING AND DESIGN OPTIMIZATIONS

(71) Applicant: WEVO, INC., Boston, MA (US)

(72) Inventors: Jon Andrews, Boston, MA (US); Charlie Hoang, Brighton, MA (US)

(73) Assignee: WEVO, INC., Boston, MA (US)

( * ) Notice: Subject to any disclaimer, the term of this patent is extended or adjusted under 35 U.S.C. 154(b) by 0 days.

(21) Appl. No.: 17/881,437

(22) Filed: Aug. 4, 2022

(51) Int. Cl.
| | |
|---|---|
| *G06F 8/65* | (2018.01) |
| *G06Q 30/0282* | (2023.01) |
| *G06Q 10/0639* | (2023.01) |
| *G06N 3/08* | (2023.01) |
| *G06N 20/00* | (2019.01) |
| *G06F 40/30* | (2020.01) |

(52) U.S. Cl.
CPC .......... *G06Q 30/0282* (2013.01); *G06N 3/08* (2013.01); *G06N 20/00* (2019.01); *G06Q 10/06393* (2013.01); *G06F 40/30* (2020.01)

(58) Field of Classification Search
CPC ........ G06N 7/005; G06N 20/00; G06F 40/30; G06Q 10/06393; G06Q 30/0282
See application file for complete search history.

(56) References Cited

U.S. PATENT DOCUMENTS

2015/0058081 A1* 2/2015 Frank .................. G06F 40/30
705/7.31
2015/0193688 A1* 7/2015 Thieberger ............. G06N 20/00
706/46
2022/0114225 A1* 4/2022 Murugesan ............ G06N 7/005

OTHER PUBLICATIONS

Guan-hua, CN 109388227, "A Method for Predicting User Experience by Using Eye Movement Data Recessive" (translation), Sep. 10, 2021, 12 pgs <CN_109388227.pdf>.*
Liu et al, CN 108228325, "Application Management Method and Device, Electronic Device, Computer Storage Medium" (translation), Dec. 29, 2020, 26 pgs <CN_108228325.pdf>.*
Zhao et al, CN 106169083, "Based on the Movie Recommendation Method and System Based On Visual Characteristic" (translation), Nov. 30, 2016, 17 pgs <CN_106169083.pdf >.*

* cited by examiner

*Primary Examiner* — Tuan A Vu
(74) *Attorney, Agent, or Firm* — Invoke

(57) ABSTRACT

Techniques are described herein for providing adaptable testing and benchmarking of user experiences with respect to one or more products. In some embodiments, the techniques include systems and methods for predicting performance of facets of a user experience under new testing and benchmarking methodologies. The systems and methods may generate a prediction for the results of a UX test even though the methodology and mechanics to quantify the user experience may vary significantly from previous methodologies. The techniques allow for methodologies to evolve over time without losing historical context or the ability to meaningfully compare historical test results with tests run using updated testing and benchmark models. Further, the techniques allow for benchmarks to be computed in real-time or near real-time as methodologies change without requiring tests to be run according to the new methodologies.

20 Claims, 10 Drawing Sheets

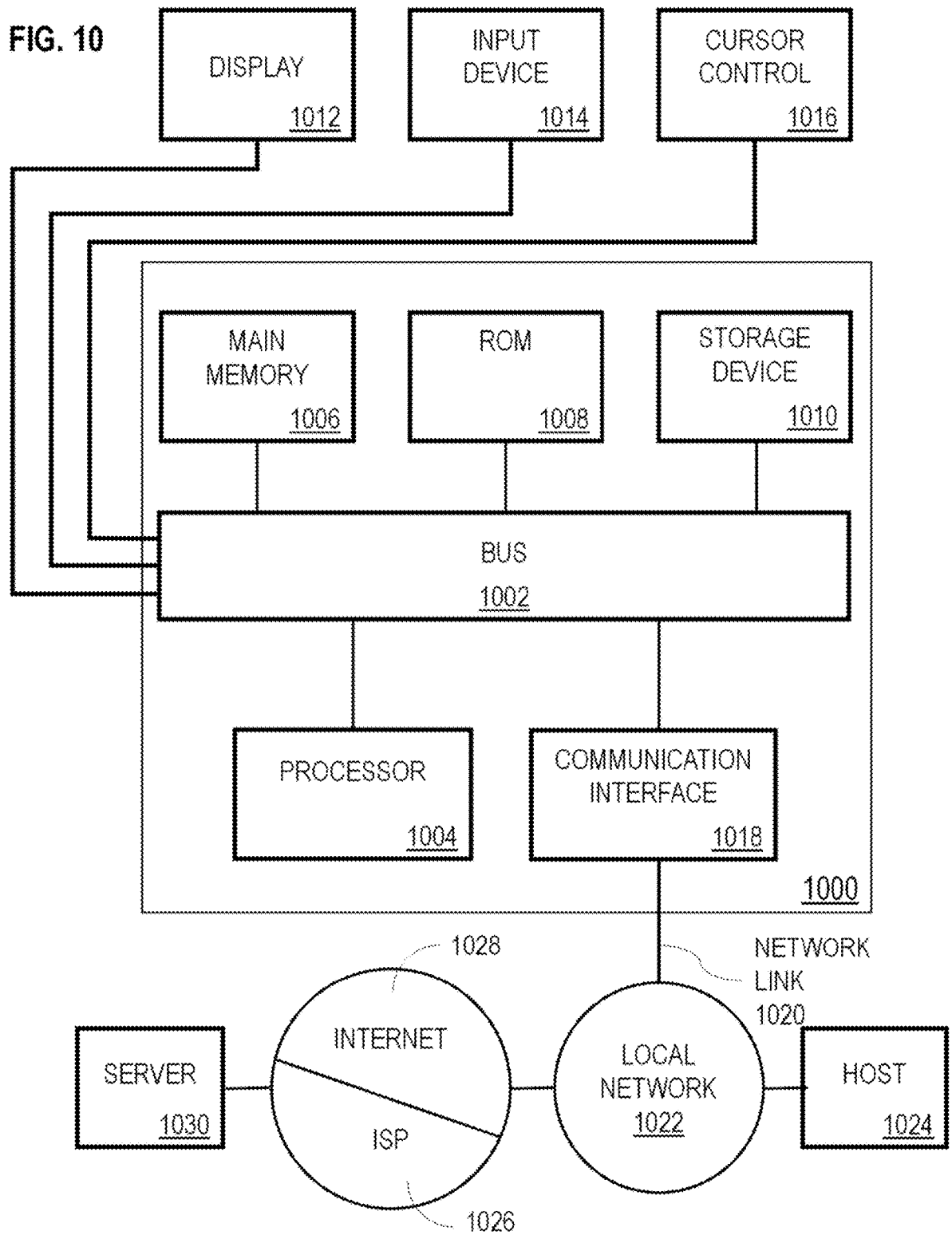

TRANSLATOR-BASED SCORING AND BENCHMARKING FOR USER EXPERIENCE TESTING AND DESIGN OPTIMIZATIONS

TECHNICAL FIELD

The present disclosure relates to techniques for evaluating and optimizing interactions between users and systems. In particular, the present disclosure relates to bi-directional translators for integrating different user experience testing and optimization models.

BACKGROUND

User experience (UX) design encompasses tools and applications for optimizing how users interact with a system, which may be comprised of physical and/or digital interfaces. Testing tools for aiding UX design often incorporate scoring and/or benchmarking models to evaluate and understand user experiences with a product. Scoring models may provide quantitative measures with respect to various facets of a user's experience, and benchmarking models may provide context to the quantitative measures. The output of these models may help isolate problematic areas of a product's design and guide what actions to take to improve user interfaces and other areas of the product that are negatively impacting the user experience.

One approach for implementing a benchmark model is to run a standardized test over different iterations of a system interface. For example, the same test may be used to collect metrics that measure various facets of a user's experience for different versions of a software application or other product. A fixed test and fixed scoring system allows for direct comparisons to be quickly performed in a quantitative space with historical context. However, fixed testing models are typically difficult to generalize, which may be problematic as the testing model becomes outdated. In particular, the facets of a user experience may evolve over time. In addition, the factors that lead to a positive impression for a particular facet of a user experience at one point in time may be significantly different than at another point in time due to changing standards and user expectations. Thus, using the same historical test to guide UX design may lead to suboptimal analysis and design choices.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 10 illustrates a computer system in accordance with some embodiments.

DETAILED DESCRIPTION

Figure 1:
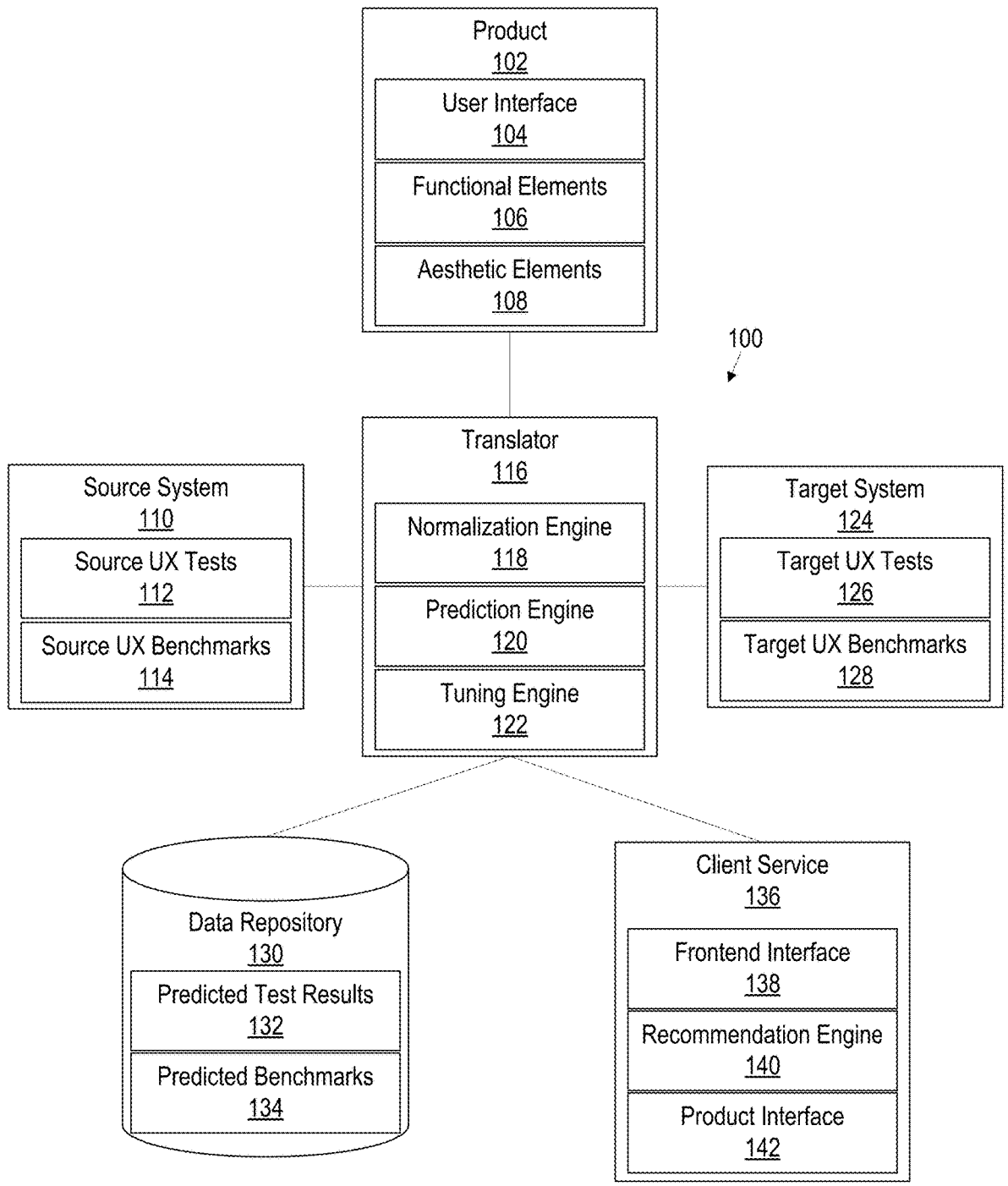
FIG. 1 illustrates an example system architecture for translator-based scoring and benchmarking of user experiences in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW

Techniques are described herein for providing adaptable testing and benchmarking of user experiences with respect to one or more products. In some embodiments, the techniques include systems and methods for estimating results for a given user experience (UX) test as a function of the results from one or more different tests. The systems and methods may generate a prediction for the result of a UX test even though the testing methodology and mechanics to quantify the user experience may vary significantly from previous UX tests used for the product. The techniques allow for testing applications and methodologies to evolve over time without losing historical context or the ability to meaningfully compare historical test results with tests run using updated testing and benchmark models. Further, the techniques allow for benchmarks to be computed in real-time or near real-time as UX testing methodology changes, yielding reliable benchmark scores without the need to wait for tests to be run using the new UX testing methodology.

In some embodiments, a translator is configured to predict the results of a target UX test given a set of input values derived from the results of one or more UX tests that have been previously run. The translator may be a model, such as a neural network, that accepts a set of input values for a first set of facets associated with a user experience. Responsive to receiving the inputs, the model may then output, based on a set of weights and/or other model parameters, a set of predictions for a second set of facets associated with the user experience. A UX facet in this context may refer to any definable aspect associated with a product that affects the user's interaction with the product. Example facets may include first impressions with the product, how intuitive a user interface is with the product, how responsive the product feels, how well the product functions for an intended use, and levels of engagement with the product. Other facets may also be defined and may vary between different testing methodologies. Additionally or alternatively, the testing methodology used to quantify a particular facet of a user experience may vary between tests. The translator may predict what the results of a UX test would be using a new, target UX testing methodology based on tests run using a previous, outdated testing methodology.

In some embodiments, the parameters of the translator model are set based on the relationship between the target UX testing methodology and one or more source UX testing methodologies. For example, weights and/or other model parameters may be computed based in part on similarities in the collection of words associated with survey questions in a source test and the collection of words associated with survey questions in the target test. As another example, model parameters may account for distributions in the selection of words selected in responses to survey questions, ratios between the selections in the target and source tests, and or other metrics that quantify relationships between the source and target tests. Additionally or alternatively, weights and/or other model parameters may be computed based in part on other similarities in the testing methodologies, such as similarities in the measurement tools and techniques used to quantify different facets in the target and source tests. The translator may apply greater weights to source facets that are highly similar to a target facet when predicting a value for the target facet than for source facets that are dissimilar.

In some embodiments, the parameters of the translator model may be iteratively tuned based on a feedback loop. For example, the translator may estimate the results of a target UX test for a user before the test is run. The UX test may subsequently be run to obtain observed test results, which may differ from the predicted results. Additionally or alternatively, administrators may inject domain knowledge into the system by adjusting the predicted values output by the translator. A model estimation error may be computed based on the difference between the observed or adjusted test results and the predicted test results for several instances of the UX test. A machine learning process may adjust the weights to reduce the model estimation error and tune the translator. The tuning process may be executed iteratively to improve the model predictions over time as more feedback is received. The translator may recompute previously predicted test results using the updated weights and/or other model parameters to reflect more refined estimates.

In some embodiments, the outputs of the translator model are used to estimate and update product benchmarks in real-time as UX testing methodologies change. The updated benchmark scores may provide insights into the areas of a product's interface and design that excel, meet expectations, or are below expectations relative to other products in the same space and/or previous versions of the product as standards evolve. Underperforming and problematic areas of a product design may be quickly isolated and addressed to optimize user interactions. For example, the output of the translator may be used to recommend and/or determine which updates to apply to address problematic areas of a product's user interface. Additionally or alternatively, the output of the translator model may be used for other applications as described further herein.

One or more embodiments described in this Specification and/or recited in the claims may not be included in this General Overview section.

2. SYSTEM ARCHITECTURE

FIG. 1 illustrates an example system architecture for translator-based scoring and benchmarking of user experiences in accordance with some embodiments. As illustrated in FIG. 1, system architecture 100 includes product 102, source system 110, translator 116, target system 124, data repository 130, and client service 136. In some embodiments, system architecture 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Product 102 refers to an item or service with which users may interact. Examples include articles of manufacture, software applications, cloud computing services, websites, virtual assistants, and other computing-based systems. Product 102 includes user interface 104 for interacting with one or more users. In the context of a computing system, service, or application, user interface 104 may render user interface elements and receives input via user interface elements. Example user interfaces include a graphical user interface (GUI), a command line interface (CLI), a haptic interface, and a voice command interface. Examples user interface elements include checkboxes, radio buttons, dropdown lists, list boxes, buttons, toggles, text fields, date and time selectors, command lines, sliders, pages, and forms.

In some embodiments, product 102 includes functional elements 106 and aesthetic elements 108, which may affect the user experience with respect to product 102. Functional elements 106 may include user interface controls through which the user may operate product 102 and/or affect the output of product 102. Functional elements 106 may further comprise backend processes and/or systems with which a user does not directly interact, but which may affect a user's experience with product 102, such as a perceived responsiveness or quality of product 102. Aesthetic elements 108 may generally comprise nonfunctional components of product 102 including the look and feel of user interface 104 and/or other design elements of product 102.

Source system 110 may generally comprise applications, processes, methodologies, and/or other components for quantifying user experiences with product 102. In some embodiments, source system 110 defines and runs source UX tests 112 for quantifying the performance of various facets of one or more user experiences with product 102. A UX test may comprise a survey or questionnaire that product users are prompted to complete after using product 102. For example, users of a website or a mobile application may be prompted to complete a survey about product 102. If the user accepts the prompt, the user may be redirected to a webpage with a set of queries to describe and/or rank various facets of the user experience with product 102.

Additionally or alternatively, a UX test application may obtain performance data for one or more UX facets using mechanisms for tracking how a user interacts with product 102. For example, scripting tags that embed executable code in a website or backend processes, such as daemons, may track and collect metrics and/or other information about user interactions with product 102. Example metrics may include how long it takes a user to first interact with a user interface element, how long it takes a user to complete a function, how long a user engages with product 102, how long it takes for pages of the user interface to load, which products features are most frequently accessed, and which product features are least frequently accessed.

Additionally or alternatively, a UX test application may obtain information about user experiences from other data sources. For example, a web scraper may crawl one or more websites for user reviews of a product to extract information about which product features are viewed most positively, which product features are viewed most negatively, what scores have been assigned for different features of the product, and what overall product score has been assigned. Additionally or alternatively, the UX test application may scrape social media sites for posts tagged with a product identifier and extract information from the posts about how users interact with the product. In yet another example, a UX test application may search customer databases and/or other sources to determine what percentage of users have returned a product, submitted a customer support ticket, or submitted a product complaint. A UX test may assign scores based on the extracted information using a scoring function or machine learning, where a UX score quantifies one or more user experiences with respect to one or more facets of the user experience. Although only one product is illustrated in FIG. 1, source UX tests 112 may be run for several different products.

Source UX benchmarks 114 may provide context to the results of a UX test for product 102. In some embodiments, source UX benchmarks 114 are computed for a product relative to similar products, also referred to herein as "peers". For example, a benchmark for a facet of a user experience may be obtained by averaging the results of source UX tests 112 for a set of products that share a common set of attributes or by using a cumulative distribution function. The functions and/or shared attributes for aggregating benchmark scores may vary between different benchmark models.

Target system 124 may also comprise applications, processes, methodologies and/or other components for quantifying user experiences associated with product 102. The methodologies and mechanisms used to quantify the user experience may differ between target system 124 and source system 110. For example, target UX tests 126 may use different querying and/or extraction mechanisms to score facets than source UX tests 112. Additionally or alternatively, the facets of the user experience that are scored by the target testing methodology may differ from the facets that are scored by the source testing methodology. Facets that are scored or otherwise quantified by the target methodology and source methodology are referred to herein as "target facets" and "source facets," respectively. The target facets and source facets that are tested by the different system may overlap, be completely different, or be identical but tested using a different methodology.

In some embodiments, target UX benchmarks 128 differ from source UX benchmarks 114. For example, the performance benchmarks may be for a different set of facets scored using target UX tests 126, as previously indicated. Additionally or alternatively, the benchmarking model may use a different function to compute benchmarks for one or more facets of a user experience. For instance, an aggregate performance benchmark may weight different facets of a user experience differently than a previous benchmark model.

In some embodiments, translator 116 is a model, such as a neural network, that predicts how the user experience of a product would be quantified according to target system 124 based on how the user experience was at least partially quantified according to source system 110. For example, translator 116 may predict a score for a facet of a user experience test by target UX tests 126 even though the face was not directly tested or quantized by source UX tests 112. Translator 116 includes normalization engine 118, prediction engine 120, and tuning engine 122. Example operations and structures of translator 116 are described in further detail in the sections below.

In some embodiments, the output of translator 116, such as predicted test results 132 and predicted benchmarks 134, are stored in data repository 130. Data repository 130 may be any type of storage unit and/or device (e.g., a file system, database, collection of tables, or any other storage mechanism) for storing data. Further, data repository 130 may include multiple different storage units and/or devices. The multiple different storage units and/or devices may or may not be of the same type or located at the same physical site. Further, data repository 130 may be implemented or executed on the same or a separate computing system as other components of system architecture 100 including translator 116. Data repository 130 may be communicatively coupled to one or more other system components via a direct connection or via a network.

Predicted test results 132 may comprise predicted results of running target UX tests 126 with respect to product 102. For example, predicted test results 132 may comprise predicted performance scores for one or more facets of the user experiences tested according to a target methodology implemented by target system 124. Predicted benchmarks 134 may represent a predicted average or other benchmark score based, at least in part, on predicted results for a set of peer products. Predicted benchmarks 134 may further factor in observed results of running target UX tests 126 for one or more peer products, if any are available. Predicted benchmarks 134 may be updated as more results are extracted by running tests according to the target methodology.

Client service 136 may comprise applications and/or systems that consume the predictions output by translator 116 and implement functions based on the consumed predictions. In some embodiments, client service 136 comprises frontend interface 138, recommendation engine 140, and product interface 142. Frontend interface 138 may comprise a user interface for presenting recommended actions, analytics, and/or other information based on the predictions. For example, frontend interface 138 may generate and render interactive charts that allow a user to compare predicted UX test scores for product 102 to performance benchmarks. The user may view which facets are underperforming relative to peer products and recommended actions to address the problems.

Recommendation engine 140 may comprise logic for generating recommendations. For example, recommendation engine 140 may determine which facets are underperforming and which solutions are predicted to improve performance with respect to the facet.

Recommendation engine 140 may leverage analytics and/or machine learning to generate the recommendations. For instance, recommendation engine 140 may track changes in benchmark performance among peer products and what technical solutions improved or worsened benchmark scores according to source system 110 and/or target system 124. Recommendation engine 140 may generate recommendations based on which solutions have the highest likelihood of increasing a benchmark score and/or the predicted magnitude of the score change.

Product interface 142 may be communicatively coupled to product 102 and allow client service 136 to invoke and/or execute functions on product 102. For example, product interface 142 may include an application programming interface (API) endpoint to send requests to a software application or service to execute a requested change in the user interface. The requests and functions that are invoked may be directed to improving underperforming facets of product 102.

The components illustrated in FIG. 1 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

One or more components illustrated in FIG. 1, such as translator 116, may be implemented as a cloud service or microservice applications. Tenants may subscribe to a cloud service to track UX benchmark scores of a product for different scoring and benchmark systems as product attributes, scoring systems, and/or benchmark models change. Additional embodiments and examples relating to computer networks are described below in Section 8, titled Computer Networks and Cloud Networks. Additional embodiments and examples relating to computer networks are described below in Section 9, titled Microservice Applications.

3. UX SCORING SYSTEMS AND TEST METHODOLOGIES

A user's experience with a product may be characterized through scores or other values that quantify various facets of a user experience. As previously mentioned, a facet may correspond to any quantifiable aspect of the user experience such as first impressions, value, usability, trust, accessibility, and/or other attributes. A scoring system may define the mechanisms and methodologies through which facets of a user's experience are characterized by scores. In some embodiments, a scoring system includes (a) a query mechanism and methodology, through which data associated with a user experience is collected, and (b) a calculation mechanism and methodology for computing a particular score of a facet. A version of a scoring system may comprise a collection of scores to be calculated and the specific mechanisms and methodologies for calculating the scores. Different versions of the scoring system and different scoring systems may vary in the specific mechanisms and methodologies used for scoring, benchmarking, and/or otherwise testing user experiences with products.

Figure 2:
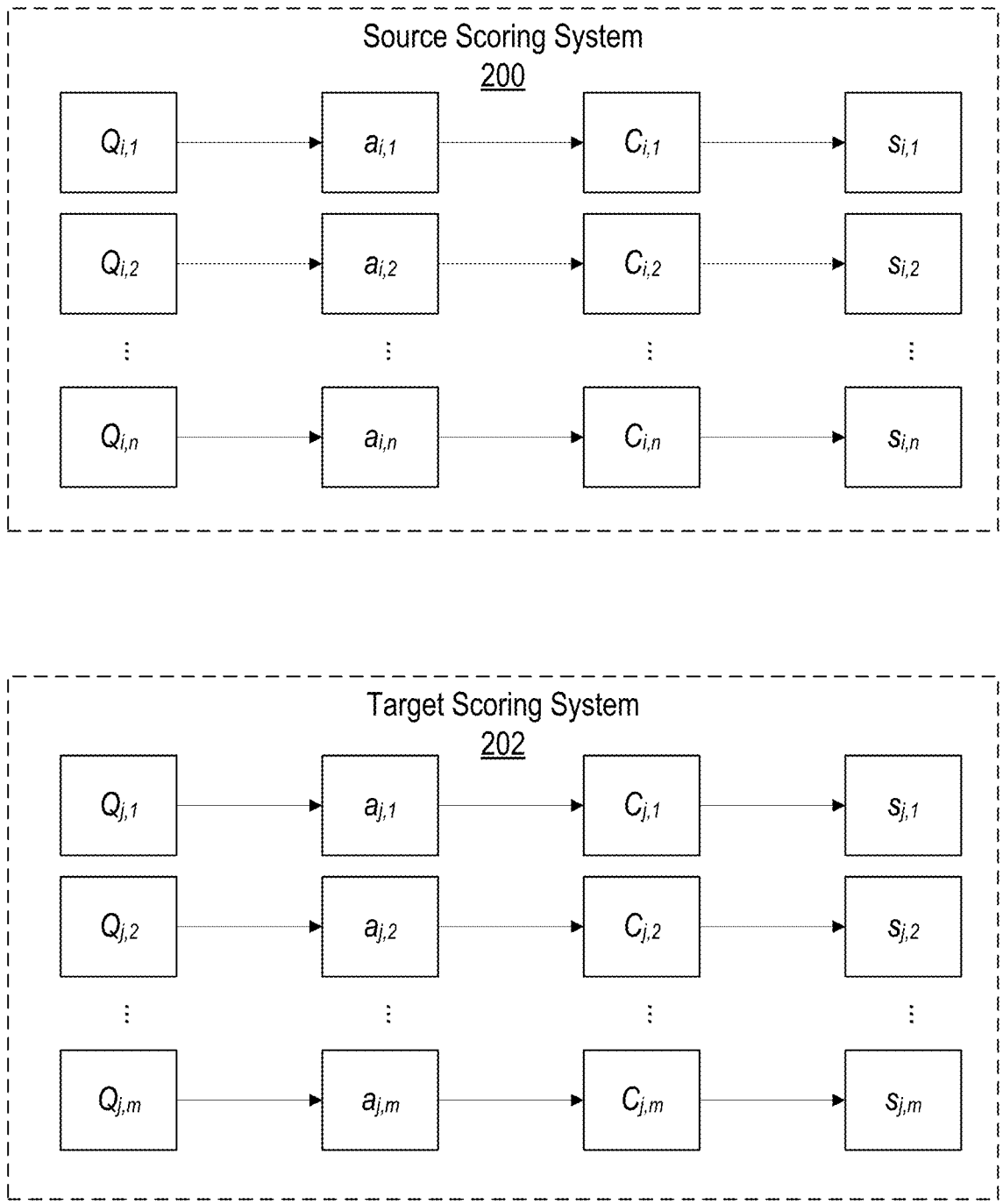
FIG. 2 illustrates an example model for source and target scoring systems in accordance with some embodiments.

FIG. 2 illustrates an example model for source and target scoring systems in accordance with some embodiments. Source scoring system 200 defines n facets of a user experience to be scored. In the example model, each facet has its own query mechanism ($Q_i$,*), collection of answers ($a_i$,*), calculation mechanism ($C_i$,*o), and score ($s_i$,*). Similarly, target scoring system 202 defines j facets of a user experience to be scored. The number of facets scored by source scoring system 200 and target scoring system 202 may be the same or different. The set of facets that are tested may also overlap, be completely different, or be identical. If testing the same facet, source scoring system 200 and target scoring system 202 may use different query mechanisms, collections of answers, calculation mechanisms, and/or scoring metrics. Thus, there are numerous potential points of variance in the mechanisms and methodologies implemented by source scoring system 200 and target scoring system 202.

In some embodiments, the query mechanism for a facet includes prompting a user with one or more questions whose answers allow the calculation mechanism to compute a score for the facet. For example, the user may be prompted to answer one or more questions about the usability of product 102. The questions may allow the user to submit descriptive answers, such as by selecting from an available set of responses or inputting a textual answer. Additionally or alternatively, the questions may allow a user to select or input quantitative answers, such as a numerical rating for a facet being queried in the prompt.

In some embodiments, the query mechanism for a facet includes code, such as embedded scripts and background processes, for monitoring and tracking user interactions with a product. The code may generally record user input signals and/or events. For instance, as indicated above, the code may execute to collect metrics about a user experience including how long it takes a user to first interact with a user interface element, how long it takes a user to complete a function, how long a user engages with a product feature, how long it takes product pages to load responsive to a user input, how long it takes product functions to execute responsive to user input, which products features are most frequently accessed, and which product features are least frequently accessed. Additionally or alternatively, the code may track and collect data about other interactions between a user and the user interface of a product.

In some embodiments, a query mechanism may comprise a web scraper that crawls social media sites and/or websites for information about user experiences with a product. For example, the query mechanism may scrape one or more websites for user reviews of a product to extract information about which product features are viewed most positively, which product features are viewed most negatively, what scores have been assigned for different features of the product, and what overall product score has been assigned. Additionally or alternatively, the query mechanism may scrape social media sites for posts tagged with a product identifier and extract information from the posts about how users interact with the product.

In some embodiments, a query mechanism may scan or search other sources in a targeted manner to extract information about user experiences, such as customer databases, transaction records, etc. The calculation mechanism may convert the extracted information to a score based on various factors including sentiment, a level of confidence that the information is accurate, and the source of the information. For instance, the calculation mechanism may compute a score between −1 and 1 for a facet of the user experience, where a score between 0 and 1 represents varying degrees of a positive user experience with 1 being the highest score, 0 represents a neutral experience, and a score between −1 and 0 representing varying degrees of a negative user experience with −1 being the lowest score. However, the scale, score values, and associated calculation mechanism may vary between different scoring systems.

In some embodiments, source scoring system 200 and/or target scoring system 202 may generate scores for nested facets. Facets may be nested according to a multi-level hierarchy. For instance, source scoring system 200 may define a hierarchy that includes a product's usability. Usability may represent a parent facet that is linked in the hierarchy to multiple child facets such as the intuitiveness of an interface, the length of time to complete a task, and/or other aspects of a product's usability. Source scoring system 200 may run UX tests for the child facets. A usability score may then be generated by averaging or otherwise aggregating the individual scores calculated for each of the individual facets. Source scoring system 200 may weight the individual scores equally or differently depending on the defined calculation mechanism. One or more of the child facets may also have children of their own, which may affect the score of each facet linked in a hierarchical chain. The hierarchy of facets that are tested, including the position and types of facets linked within the hierarchy, may vary between different scoring systems. In other cases, source scoring system 200 and/or target scoring system 202 may not define any hierarchy.

In some embodiments, running a UX test comprises executing the query, collection, calculation, and/or scoring mechanisms of a scoring system. A set of UX tests that are run using the same methodology and mechanisms may be referred to herein as different instances of a UX test. A scoring system may run several instances of a UX test to generate scores for multiple user experiences of the same product and/or multiple user experiences across different products according to the defined methodology. Source scoring system 200 may run UX tests according to a source methodology, and target scoring system 202 may run UX tests according to a target methodology.

Scoring systems may have variability between UX tests. For example, source scoring system 200 may run a UX test to score a facet for one user experience. When the UX test is run for another user experience, the same facet may not be scored. This scenario may occur if the query mechanism was not able to receive an answer or extract sufficient information for the calculation mechanism to compute a score for a particular facet. Thus, the combination of facets that are scored by a UX test run according to the same UX source methodology may vary from one instance of the test to another and from one user experience with a product to the next.

Benchmarks for source scoring system 200 may be obtained by running a set of UX tests according to the source methodology and aggregating the results. For instance, a benchmark for a source facet may be obtained by averaging the scores of several instances of a UX test for different products that share a set of one or more common attributes. Overall UX scores and benchmarks may be obtained by summing and averaging the individual facet scores. Facet scores may be equally weighted or weighted differently depending on the benchmark model. Similarly, benchmarks for test scoring system 200 may be obtained by running a set of UX tests according to the target methodology and aggregating the results. The resulting benchmarks may be for a different combination of facets than the benchmarks computed according to the source methodology. Even for facets that are the same in the source and target systems, the benchmarks may diverge due to differences in the query mechanisms, collection of answers, and/or manner in which the scores are calculated.

In some embodiments, target scoring system 202 represents an updated version of source scoring system 200. Applications or users may update the query mechanism, collection of answers, calculation mechanism, and/or scoring values defined by source scoring system 200 to generate target scoring system 202. For example, a query mechanism for quantifying a first impression may involve measuring how long it takes for the first user interaction to occur. A user may then update the query mechanism such that the query mechanism for the facet involves measuring how long it takes for the first click to occur. As another example, a user may update a survey question and/or the collection of available responses with respect to a facet.

Additionally or alternatively, a user may modify the collection of facets that are scored including adding new facets, removing existing facets, and updating the hierarchy of facets. Facets that were previously on the same level in a hierarchy may be nested. Conversely, a facet that is a child of another facet may be moved to the same level as the parent such that the two are tested and scored independently.

Additionally or alternatively, the calculation and scoring mechanisms may be updated. For example, the function used to compute scores for a facet may be updated, such as by modifying the source code or logic of the calculation mechanism. As another example, a scoring scale between −1 and 1 may be updated from 1 to 10 or some other scale. As may be appreciated, the number of possible changes and differences between the two systems may be significant.

4. TRANSLATOR PREDICTIONS AND STRUCTURE

When UX testing methodologies initially change, there may not be any UX tests results to calculate a benchmark under the new system. One option is to wait for a statistically significant number of tests to be accumulated to create a meaningful benchmark using the new scoring system. However, delaying performance analysis according to updated standards may negatively impact product design choices and performance optimizations. To avoid such delays, translator 116 may convert historical test results into predicted results according to the new system. Benchmarks may then be computed based on the predicted results, such as by averaging or otherwise aggregating the predicted results. The results of any UX test instances that have been run under the new system may also be averaged or otherwise aggregated with the predicted results to compute the benchmarks.

Figure 3:
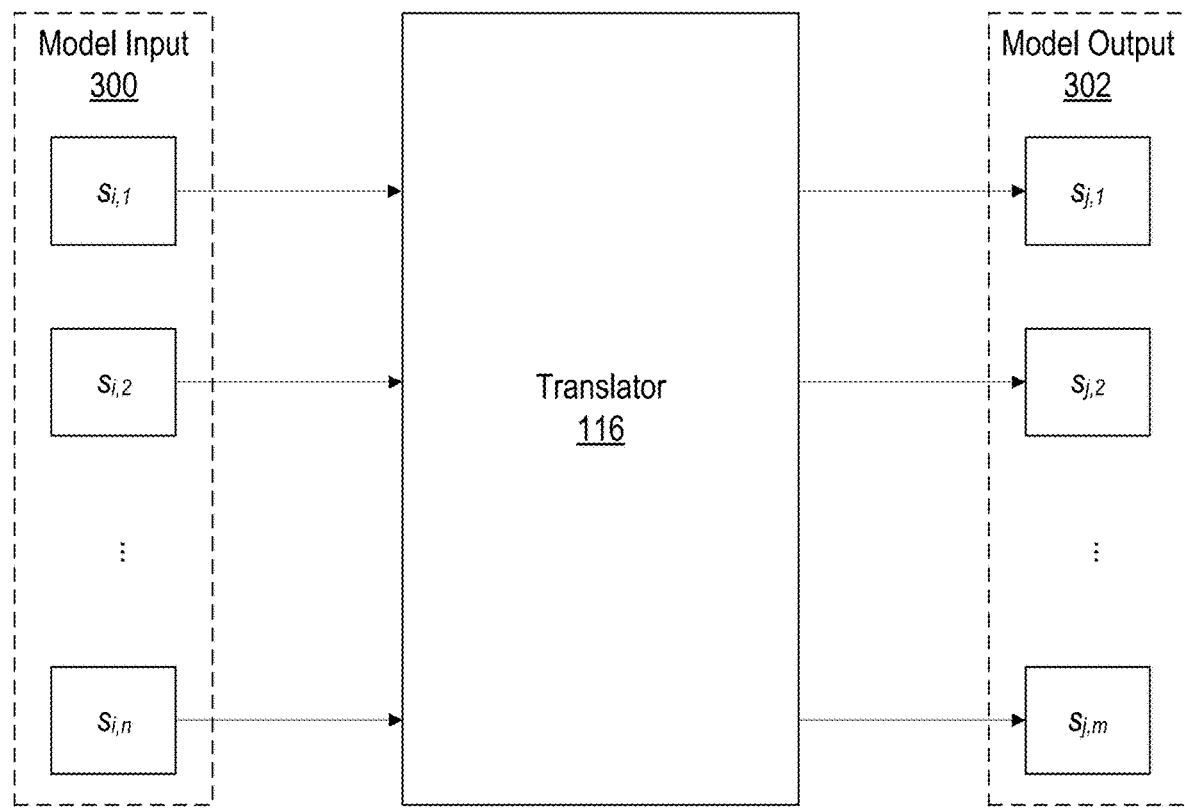
FIG. 3 illustrates an example dataflow diagram for translator-based conversions between different systems in accordance with some embodiments.

FIG. 3 illustrates an example dataflow diagram for translator-based conversions between different systems in accordance with some embodiments. Model input 300 is a feature vector that includes n features representing different facets scored by source scoring system 200. These values are fed into translator 116, which generates model output 302. Model output includes a set of m predicted facet scores according to target scoring system 202. As described further herein, translator 116 may apply weights, biases, functions, and/or other logic to the input values to map the results of one system to predictions under another system. The number of model outputs, represented by m, may be the same as the number of inputs, less than the number of inputs, or greater than the number of inputs depending on how many facets are scored by the source system and how many facets are scored by the target system.

Although only one translator is depicted in FIG. 3 and other examples described herein, some embodiments may include multiple translators. By chaining multiple translators together, the results of any UX test may be rendered in any version of a scoring system. For example, model output 302 may be fed into a second translator to generate predictions for scores under a new version of scoring system 202. The benchmarks under a new scoring system and methodology may thus leverage historical UX tests from several different scorings systems.

In some embodiments, translator 116 is bi-directional. For instance, translator 116 may receive results of UX test run by target scoring system 202 as input and output a prediction of what the results would be under source scoring system 200. To derive the n predicted scores and generate the output in the reverse direction, the weights, biases, and/or other functions implemented by the model may be inverted and applied to the m input values. With a bi-directional model, comparisons may be made with how a current product would perform relative to historical benchmarks.

In some embodiments, translator 116 may receive inputs from multiple UX tests to generate a predicted result for a target UX test. For example, for a given user experience, translator 116 may receive, as input, the n facet scores from source scoring system 200 as illustrated in FIG. 3 and an additional set of facet scores from another scoring system. Translator 116 may then generate model output 302 as a function of the inputs received from the different scoring systems and methodologies.

Figure 4:
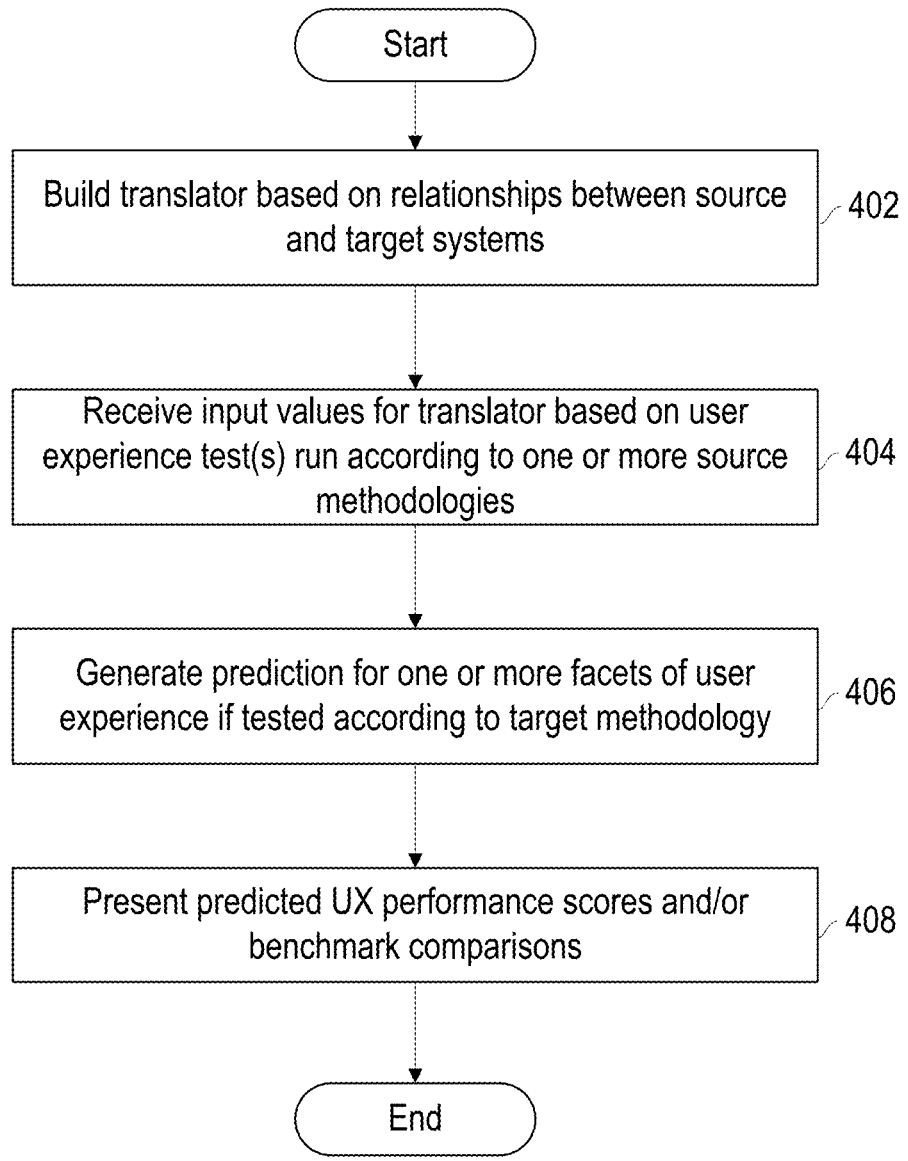
FIG. 4 illustrates an example set of operations for generating and presenting predicted performance scores and benchmarks for a user experience in accordance with some embodiments.

FIG. 4 illustrates an example set of operations for generating and presenting predicted performance scores and benchmarks for a user experience in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

Referring to FIG. 4, the process includes building a translator based on relationships between the source and target systems (operation 402). As previously indicated, the translator may be a predictive model comprising a set of one or more computational processes or programs that operate on inputs to generate a set of predictions according to a set of model parameters. In some embodiments, building the translator may comprise selecting model parameters, such as weights and bias values in a neural network. The model parameters may be tuned and adjusted at application runtime using feedback and machine learning as described further in Section 6, titled Prediction Adjustments.

In some embodiments, the weights and/or other model parameters are determined based on a strength of relationship between a source facet and a target facet. With respect to FIG. 3, for instance, the process may determine, for the source facet represented by score $s_{i,1}$, a relationship strength with each of the m target facets to be scored by the target system. The process may iterate through each of the remaining n source facets to compute relationship strengths for each source-target facet pair.

In some embodiments, the strength may be determined based on similarities and/or correlations between the query mechanisms, collection of answers, calculation mechanisms, and/or scales between the two systems. For example, a strength value may be computed based on the similarity in the collections of words used in a survey question or the metrics that are tracked. Queries that have a high ratio of overlapping words may be assigned a higher strength or weight value than queries with few overlapping words. Additionally or alternatively, natural language processing may be executed to compare the meaning of a source and target query and assign a strength as a function of how similar the meanings of the query are. As another example, a source query mechanism that tracks a first user interaction may have a strong relationship to a target query mechanism that tracks the first mouse click event and another target query mechanism that tracks time spent on a page but a weaker relationships strength with a session length and/or other UX metrics. Scores for source facets that have a strong relationship strength to a target facet may be assigned a higher weight within the model than source facets with lower relationship strengths such that the score of the more highly weighted facet has a greater contribution to the target facet prediction than the lower-weighted facet. In some cases, the score for a source facet may not contribute at all to the predicted score for a target facet. Additionally or alternatively, a facet may have a strong but negative correlation with a target facet score. In this case, a high score for the source facet may strongly contribute to a lower score in the target facet or vice versa. Thus, the model parameters may vary significantly depending on the relationships between the different facets, mechanisms, and methodologies defined by the source and target systems.

Referring again to FIG. 4, the process receives a set of input values for the translator based on one or more UX tests run according to one or more source methodologies (operation 404). For example, the process may receive an n-dimensional feature vector as previously described, where each feature represents a different facet of user experience quantified by a source scoring methodology.

Responsive to receiving the set of input values, the process generates a set of predicted scores for one or more facets of a UX if tested according to the target methodology (operation 406). In some embodiments, the model is applied to the input feature vector by performing a forward propagation, described in further detail below. Generally, applying the model may comprise applying the weights, biases, functions, and/or other model parameters that have been selected and tuned to generate an m-dimensional vector comprising in predictions quantifying in different facets of the user experience according to the target methodology.

The process further presents predicted UX performance scores for the user experience and/or benchmark comparisons (operation 408). To compute benchmarks, the process may iterate through operations 404 and 406 for several instances of a UX test across a set of peer products and average the results. Product designers for a particular product may then view the predicted performance scores relative to predicted industry benchmarks to provide context and meaning to the scores under the new scoring system.

Figure 5:
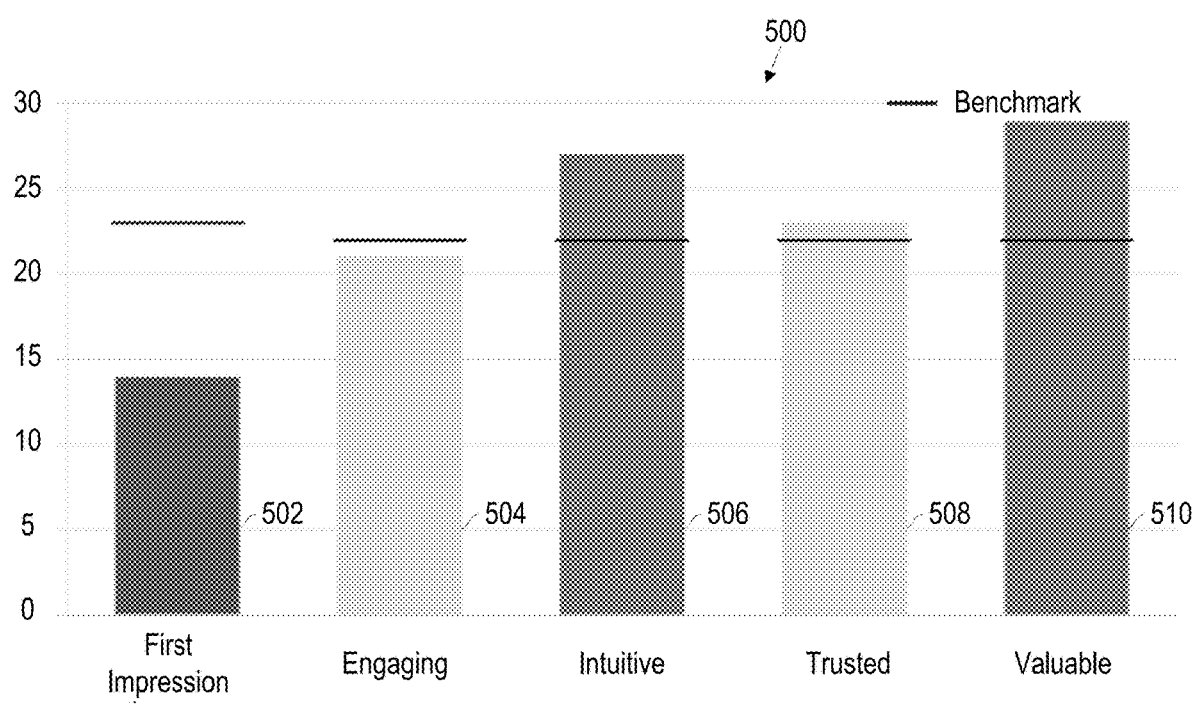
FIG. 5 illustrates an example visualization of predicted performance scores relative to benchmarks in accordance with some embodiments.

FIG. 5 illustrates example visualization 500 of predicted performance scores relative to benchmarks in accordance with some embodiments. A GUI may generate and render visualization 500 based on the output of translator 116. Visualization 500 includes a bar chart showing the performance scores of various facets relative to benchmarks. Bar chart 502 indicates that the predicted first impression is significantly lower than the benchmark. Bar chart 504 and 506 indicate that predicted engagement and trust, respectively are close to the benchmark. Bar chart 506 and 510 indicate that the intuitiveness and value of the product significantly exceed performance benchmarks.

Visualization 500 may present visual indicators to highlight which facets of a user experience are predicted to significantly underperform benchmarks. For example, bar chart 502 may be presented in a different color and/or include an overlaid label to highlight the underperformance. Additionally or alternatively, visualization 500 may allow a user to drill down into different facets if nested according to the target system. For example, a user may click on or otherwise select "first impression" to view scores for child facets contributing to the overall score. By drilling down, the user may view which specific areas of a product have the lowest performance. Visualization 500 may further present recommendations and available actions based on the translator output as described further below in Section 7, titled Recommendations and Product Optimizations.

Figure 6:
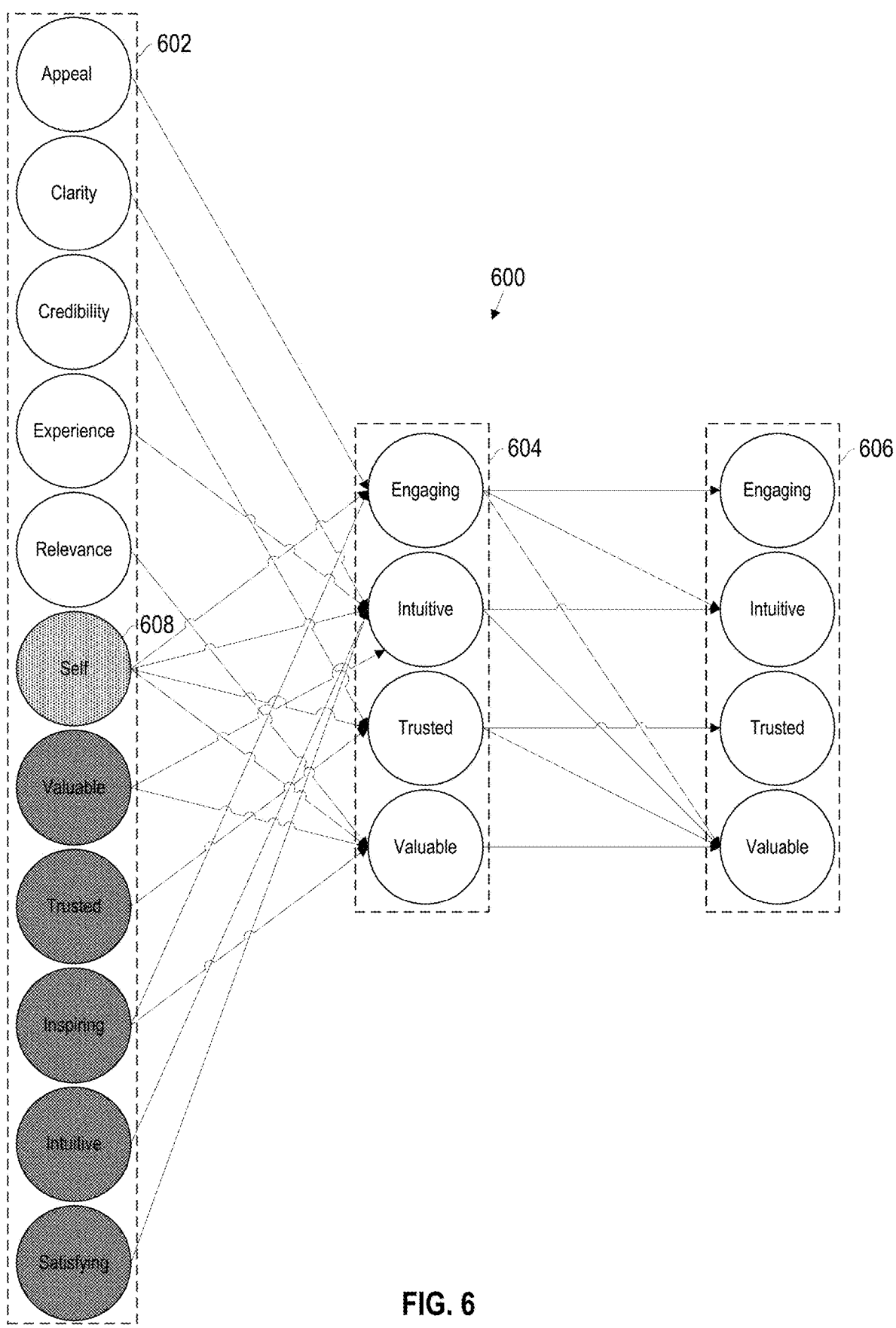
FIG. 6 illustrates an example neural network translator model in accordance with some embodiments.

FIG. 6 illustrates example neural network translator model 600 in accordance with some embodiments. Neural network translator model 600 includes input layer 602, hidden layer 604, and output layer 606. Each layer within neural network translator model 600 includes a plurality of nodes or "cells." A cell may be connected to one or more nodes of another layer. For example, a cell representing the source facet Appeal is connected to a cell representing the target facet Engaging in hidden layer 604, which is connected to multiple nodes in output layer 606.

In some embodiments, each connection between nodes is associated with a weight. For example, a value between 0 and 1 may be determined for each pair of cells within different layers. A weight of 0 may represent no connection, and weights between 0.1 and 1 representing various strengths of connection with higher weights representing a greater relationship strength. In other embodiments, negative weights may be used to reflect inverse relationships between source scores and target scores.

In the example illustrated in FIG. 6, input layer 602 includes facets from two different UX tests and a self-score. The facets from the first UX test are illustrated above cell 608, and the facets from the second UX test a listed below. Cell 608 represents a self-score, which may be computed by averaging the scores of the top five facets or the bottom five facets depending on which UX test results are being fed into the model. The self-score may help provide context to the result data and provide a balance to the normalization process described further in Section 5, titled Model Input Normalization. However, the facets that are input into the translator model may vary depending on the source methodologies.

In some embodiments, neural network translator model 600 uses forward propagation to compute the predicted scores for the four target facets illustrated in output layer 606. Forward propagation is a process through which the input values are fed in a forward direction through the network to generate the set of output values. The weights, biases, and functions may be applied at each layer as illustrated from left to right, resulting in the set of predictions for the target scoring system. The output of the neural network may be consumed or otherwise used by applications to render visualizations, present recommendations, and/or trigger other automated actions including those described herein.

5. MODEL INPUT NORMALIZATION

As indicated above, translator 116 may be built by defining explicit relationships between a source and target system. However, there may be variability between UX tests potentially resulting in gaps in the facets that are scored. Normalization engine 118 may fill in gaps in the model input by inferring values for a missing facet score.

Figure 7:
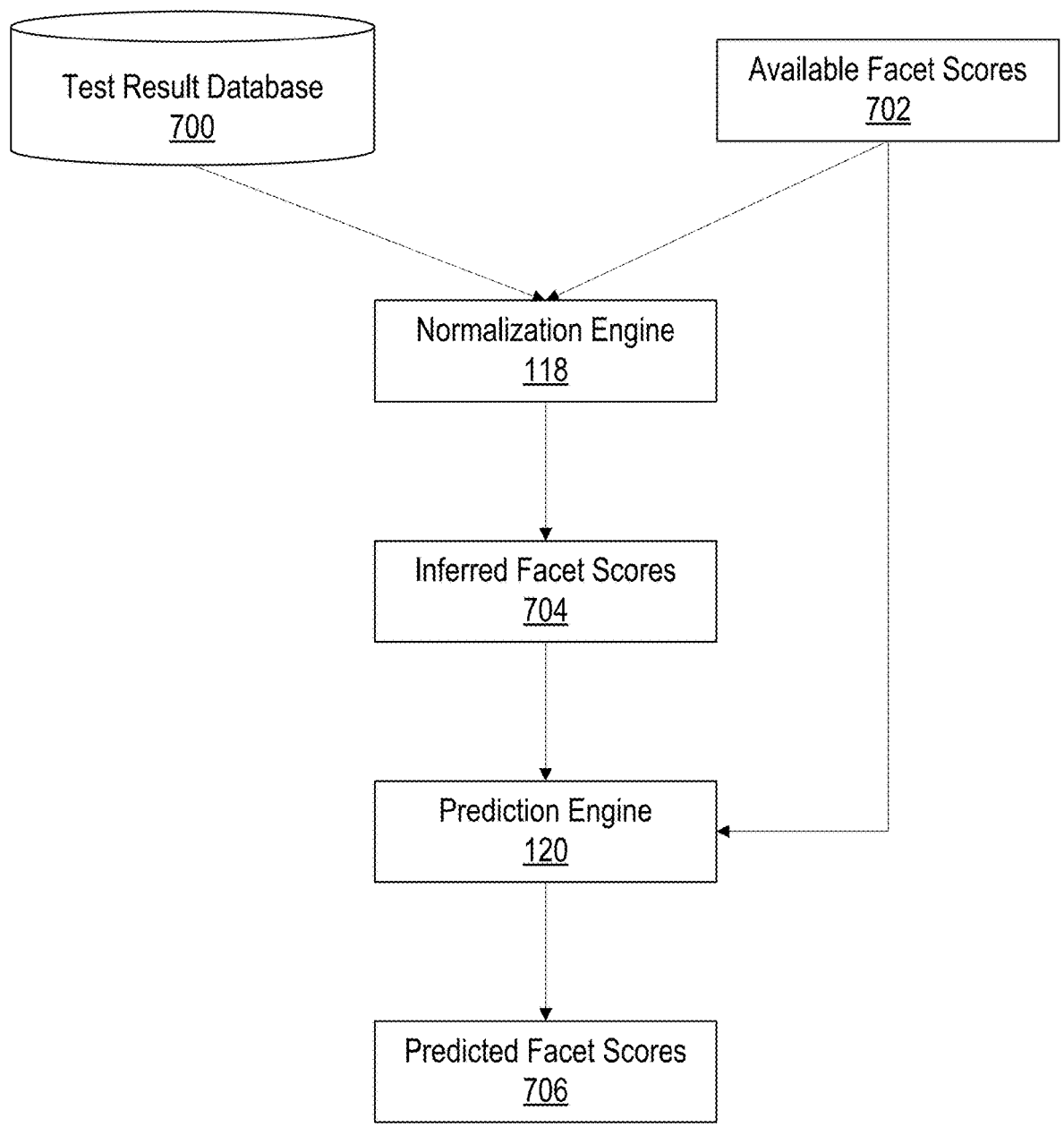
FIG. 7 illustrates an example dataflow diagram for normalizing translator model inputs in accordance with some embodiments.

FIG. 7 illustrates an example dataflow diagram for normalizing translator model inputs in accordance with some embodiments. Normalization engine 118 receives available facet scores 702 for a given UX test. Normalization engine 118 may analyze the scores to determine if any facet scores are missing before being fed through the prediction model.

If a test is missing a facet score, then normalization engine 116 may search test result database 700 for a collection of similar tests that have scored the facet of the user experience. The similar tests may follow the same methodology or a different methodology. Normalization engine 116 may then estimate the missing facet score based on inferences made from the historical test results. The output of normalization engine 116 includes one or more inferred facet scores 704. Available facet scores 702 and inferred facet scores 704 may be fed into prediction engine 120, which may apply the translator model, as previously described, to generate predicted facet scores 706 under the target methodology. In some embodiments, a self-score may also be fed as input into the model, where the self-score is generated by averaging available facet scores 702 that existed before normalization. Predictions may be generated based on a weighted sum of the self-score and a subset of the normalized scores to balance the inferred values against the actual test results.

The specific manner in which scores are inferred may vary from implementation to implementation. In some embodiments, the process includes computing an aggregate score for the user experience based on the available facet scores and searching test result database 700 for UX tests with similar aggregate scores, such as tests within a threshold range of the aggregate score or the top n tests with the closest scores. The process may then rank the identified tests by proximity in the aggregate space and select a subset of the closest tests. The missing facet scores may then be computed by averaging the scores from the selected tests.

In some embodiments, normalization engine 118 may use machine learning to infer missing facet scores. Machine learning includes algorithms that can be iterated to learn a target model f that best maps a set of input variables to an output variable, using a set of training data. The training data includes may include historical UX test results with the input variables including historical test scores for the available facets and the output variables the missing facet scores. The model parameters may be updated based on, for example, feedback on the accuracy of the current target model f with respect to predicting the output variable as a function of the input variables with respect to historical test results. By iteratively adjusting the machine learning model parameters based on the feedback loop, the model may learn relationships and patterns between the input set of facets and the missing set of facets. Available facet scores 702 may then be fed through the model to output inferred facet scores 704. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

6. PREDICTION ADJUSTMENTS

In some embodiments, the model predictions and parameters may be adjusted based on a feedback loop. The feedback may include input from system administrators and/or end users viewing the predictions. Additionally or alternatively, the feedback may include results of running UX tests according to the new methodology. The results may be compared with predictions to determine a model estimation error. Based on the error, adjustments may be made to the model weights and/or other parameters to improve model robustness and accuracy.

Model tuning may involve separate processes from the initial build of a model. In the latter case, the model may be built based on similarities and relationships between various aspects of a source and target scoring system, such as the query and calculation mechanisms. The tuning process may be implemented based on observed results and feedback without explicitly analyzing similarities between testing mechanics and methodologies.

Figure 8:
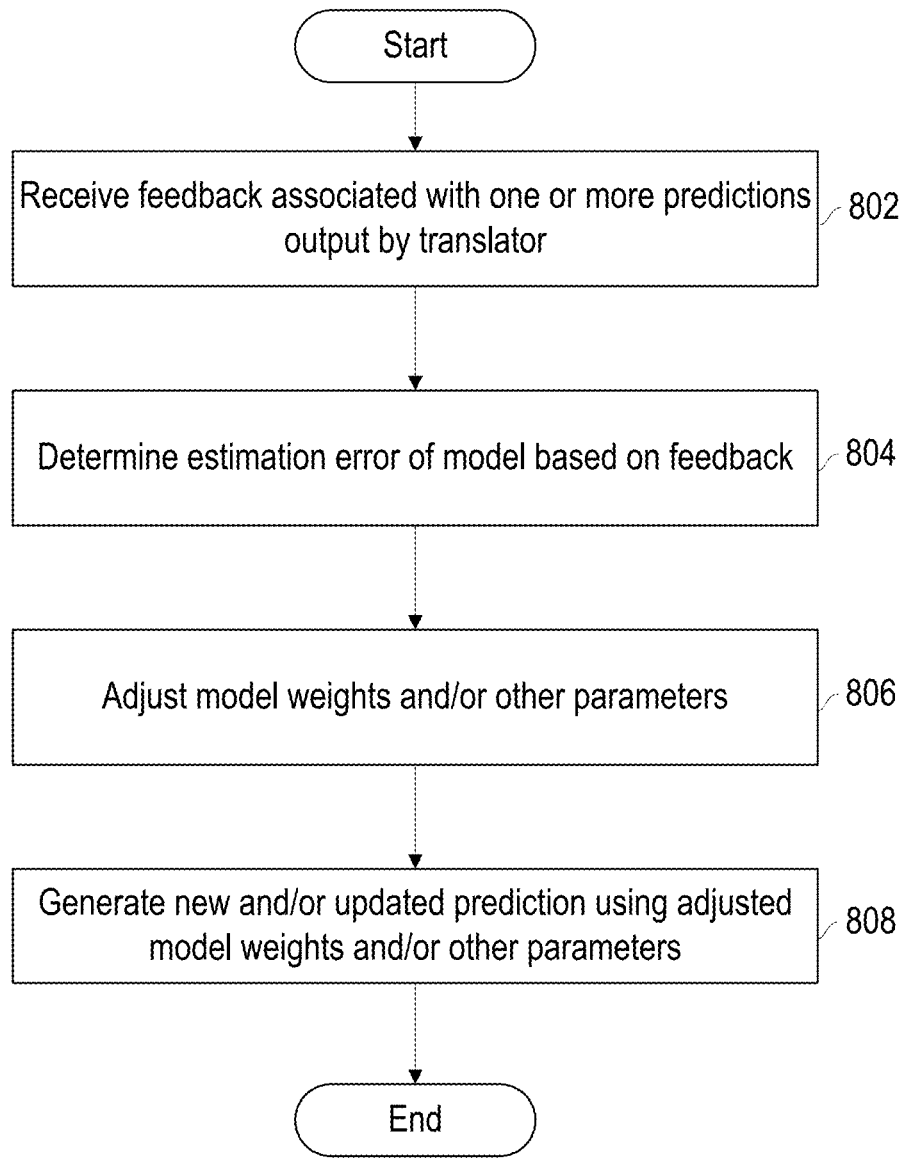
FIG. 8 illustrates an example set of operations for updating a translator based on feedback in accordance with some embodiments.

FIG. 8 illustrates an example set of operations for updating a translator based on feedback in accordance with some embodiments. One or more operations illustrated in FIG. 8 may be modified, rearranged, or omitted all together. Accordingly, the particular sequence of operations illustrated in FIG. 8 should not be construed as limiting the scope of one or more embodiments.

The process includes receiving feedback associated with one or more predictions output by translator 116 (operation 802). In some embodiments, the feedback comprises comparing a predicted score for a product to one or more observed user experience scores for the product. Additionally or alternatively, administrators or other users may adjust the feedback using domain knowledge and intuition. The users may increase or decrease a predicted score for one or more of the test facets.

The process next determines an estimation error of the model based on the received feedback (operation 804). The estimation error may be determined by computing a difference between the adjusted or observed value of a target facet and the predicted value.

The process further adjusts the model weights and/or other parameters based on the estimation error (operation 806). For instance, a model may train and tune a neural network using backpropagation. Backpropagation is a process of updating cell states in the neural network based on gradients determined as a function of the estimation error. With backpropagation, nodes are assigned a fraction of the estimated error based on the contribution to the output and adjusted based on the fraction. Thus, the weights of the connections between cells of neural network 600 may be adjusted in an unsupervised manner. Additionally or alternatively, connections may be added and/or removed between cells based on the estimation error. The adjustments may be made to reduce and minimize the estimation error of the model. In other embodiments, the process may use other machine learning algorithms to train and tune model parameters, such as regression analysis or other methods based on gradient descent.

The process further generates new and/or updated predictions using the adjusted model weights and/or other parameters (operation 808). Updating model predictions may help keep product designers apprised of evolving performance and benchmark scores. For example, translator 116 may generate an initial prediction for product 102 according to the target methodology. As more and more target UX tests 126 are run with respect to peer products, the benchmark may be updated, and the parameters of the model may be adjusted based on the feedback. Translator 116 may then update the predicted scores for product 102 based on the updated model parameters. The benchmarks may also be updated based on the new UX test data and compared to the updated predictions. Product designers may be notified of the updates, such as via an application interface, email, short message service (SMS) message, or other notification mechanisms. The notification may allow the product designers to navigate to a GUI, such as a webpage or application page, that is rendered based on the update and allows the user to view changes in the predicted performance of product 102 relative to its peers.

In some embodiments, predictions may be updated as changes in UX testing methodologies and mechanisms are detected. For example, a translator may monitor the collection of facets, query mechanisms, collection of answer, and/or calculation mechanisms of a scoring system for changes. As changes are detected, the translator may be modified, or a new translator model may be generated. The updated translator may then be applied to historical test data to provide real-time benchmark scores and performance predictions as scoring models change.

Figure 9:
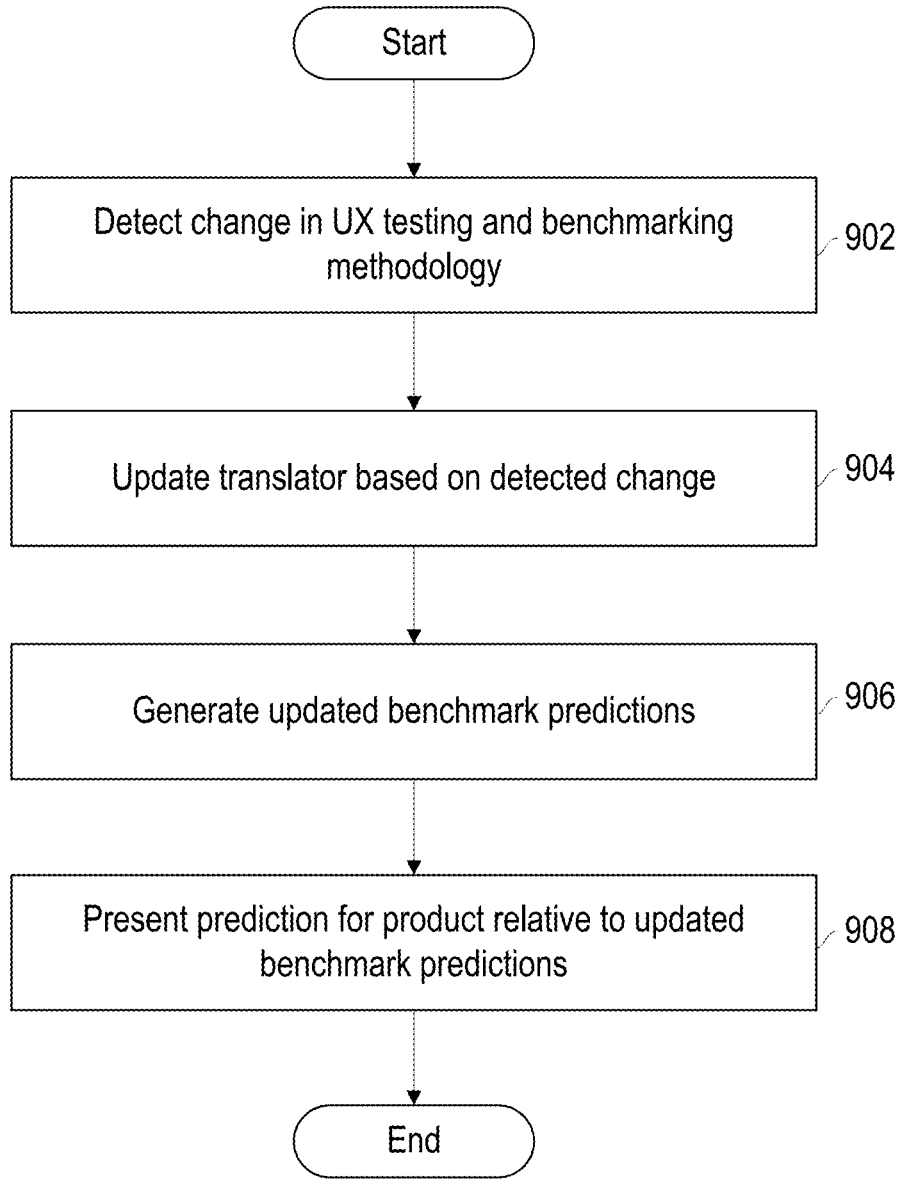
FIG. 9 illustrates an example set of operations for updating a translator based on detected changes in testing and benchmarking methodologies in accordance with some embodiments.

FIG. 9 illustrates an example set of operations for updating a translator based on detected changes in testing and benchmarking methodologies in accordance with some embodiments. One or more operations illustrated in FIG. 9 may be modified, rearranged, or omitted all together. Accordingly, the particular sequence of operations illustrated in FIG. 9 should not be construed as limiting the scope of one or more embodiments.

Referring to FIG. 9, the process detects a change in the UX testing methodology (operation 902). As previously noted, the change may be in the collection of facets, such as the addition or removal of a facet. Additionally or alternatively, the change may relate to the query mechanism, collection of answers, calculation mechanism, and/or scoring scale used to quantify the facet.

The process next updates the translator based on the detected change (operation 904). For example, the process may execute operation 402 to update or rebuild the model. Thus, the relationship strengths between the previous versions of the scoring system and the new version may be determine and used to set the model weights, connections, and/or other parameters.

The process further generates updated benchmark predictions using the new model (operation 906). For example, the process may be applied to a set of historical test results under the previous version of scoring system. Additionally or alternatively, the updated translator model may be chained to one or more previous versions of the model to generate predictions under older scoring systems.

The process further presents predictions for one or more products relative to the updated benchmark predictions (operation 908). For example, the process may predict how product 102 performs relative to the new benchmarks according to the updated testing and benchmarking methodology. The updated predictions may be sent or presented to one or more users as previously described.

7. RECOMMENDATIONS AND PRODUCT OPTIMIZATIONS

In some embodiments, applications may provide recommendations and/or trigger actions directed to optimizing a product based on the output of translator 116. The recommendations and/or actions that are triggered may vary depending on which facets are predicted to underperform relative to a benchmark. For example, responsive to detecting load times causing negative usability scores, recommendation 140 may present, via frontend interface 138, programming techniques and/or tools that are predicted to address the problem and improve performance. Additionally or alternatively, recommendation engine 140 may generate recommendations based on which peer products are predicted or observed to significantly exceed a performance benchmark. For instance, recommendation engine 140 may determine a correlation between running a web service on a particular platform and an increased score for a particular facet. Recommendation engine 140 may present a recommendation to migrate the service to the platform. The recommendation may indicate how the migration is predicted to improve a performance score relative to the benchmark. Additionally or alternatively, recommendation engine may recommend other actions, such as changing one or more aesthetic elements 108 and/or functional elements 106 of user interface 104, that are predicted to improve one or more target facet scores.

In other example applications, translator 116 may be used to compare how different versions of a product are predicted to perform under a new scoring system. For example, different versions of a product may have slight variations in functional and/or aesthetic elements. Historical UX test data for the different versions of the product may be fed through translator 116 to generate and compare predicted facet scores. The output may help guide decisions on what functional elements and/or aesthetic elements to keep from different versions in a product design, and which elements to update.

Additionally or alternatively, applications may trigger other actions based on the output translator 116. Examples may include updating user interface 104, functional elements 106, and/or aesthetic elements 108 in a manner that is predicted to improve one or more facet scores.

In some embodiments, machine learning models are trained and applied to generate the predictions. For example, a set of training examples may include data indicating: (a) what updates were implemented on a product; (b) which facets quantified by a UX test increased or decreased after the update; and (c) the magnitude of the change for each or the facets scored. During the training phase, a feature vector may be formed for each training example as a function of a set of product attributes, facet scores before an update was performed, and attributes defining the update that was performed. A label for the example may indicate a magnitude and/or direction of change in the facet scores. The training process may then learn the weights and/or other model parameters based on an iterative process whereby different sets of model parameters are used to estimate the label of a subset of the training data. In this case, the prediction may estimate whether an update will increase or decrease a facet score under the target system and by what magnitude. Based on differences between the estimates and the labels, the model parameters may be updated, such as by using gradient descent to minimize an error function associated with the model as previously discussed. The trained model may then be applied to a new product to generate predictions for various possible updates by forming a set of feature vectors in the same manner used during the training process. That is, a set of feature vectors may be formed with each feature vector comprising a set of product attributes for the new product, a set of predicted facet scores under the target system, and a set of attributes for a potential product update. The set of model parameters that were learned may then be applied to the feature vector for the new product, which may be unique and not included in the training dataset, to predict how various updates would affect the facet scores of the product under the target system. Recommendation engine 140 may select and recommend one or more updates that are predicted to increase the facet scores by the greatest magnitude. Additionally or alternatively, client service 136 may trigger the one or more updates via product interface 142.

8. COMPUTER NETWORKS AND CLOUD NETWORKS

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. MICROSERVICE APPLICATIONS

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

10. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which some embodiments of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

11. MISCELLANEOUS; EXTENSIONS

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a first set of values that quantify a user experience associated with a product according to at least one source methodology;
generating, by a model based on the first set of values that quantify the user experience associated with the product according to said at least one source methodology, at least one prediction that quantifies the user experience associated with the product according to a target methodology, wherein the target methodology is different than said at least one source methodology, wherein the target methodology defines an updated benchmark model that modifies a benchmark model used by said at least one source methodology;
presenting, based on said at least one prediction for the user experience associated with the product according to the target methodology, an indication of a predicted performance of the product with respect to at least one facet of the user experience;
tracking changes to the updated benchmark model; and
responsive to detecting changes to the updated benchmark model, generating, by the model, new predictions for the user experience under the updated benchmark model without running a test to directly measure benchmarks under the updated benchmark model.

2. The method of claim 1, further comprising:
receiving, by the model, feedback associated with said at least one prediction;
responsive to receiving the feedback, performing at least one update to at least one parameter of the model; and
generating, by the model based at least in part on said at least one update to said at least one parameter of the model, at least one additional prediction for the user experience associated with the product.

3. The method of claim 1, further comprising:
detecting a change in the target methodology; and
responsive to detecting the change in the target methodology, updating at least one parameter of the model.

4. The method of claim 1, wherein one or more of the first set of values are generated by running a user experience test according to the first methodology.

5. The method of claim 1, further comprising:
determining that an input value to the model is missing;
responsive to determining that the input value to the model is missing, inferring the input value based on one or more other input values to the model;
wherein the first set of values includes the input value inferred from the one or more other input values to the model.

6. The method of claim 1,
wherein the model is a neural network comprising a plurality of cells and connection weights between different cells of the plurality of cells;
wherein the connection weights between different cells of the plurality of cells are determined based at least in part on relationship strengths between the facet tests in the target methodology and facet tests in said at least one source methodology.

7. The method of claim 6, further comprising:
performing unsupervised adjustments of the plurality of connection weights based at least in part on an estimation error of the model;
wherein the estimation error is determined based at least in part on a difference in said at least one prediction and a result of running a user experience test according to the target methodology.

8. The method of claim 1, wherein the indication identifies at least one facet that is predicted to underperform relative to a benchmark.

9. The method of claim 1, further comprising:
executing an action based at least in part on said at least one facet that is predicted to underperform relative to the benchmark; wherein the action includes at least one of recommending or deploying an update to the product that is predicted to improve the user experience with respect to said at least one facet.

10. One or more non-transitory computer-readable media storing instructions which, when executed by one or more hardware processors cause:
receiving a first set of values that quantify a user experience associated with a product according to at least one source methodology;
generating, by a model based on the first set of values that quantify the user experience associated with the product according to said at least one source methodology, at least one prediction that quantifies the user experience associated with the product according to a target methodology, wherein the target methodology is different than said at least one source methodology, wherein the target methodology defines an updated benchmark model that modifies a benchmark model used by said at least one source methodology;
presenting, based on said at least one prediction for the user experience associated with the product according to the target methodology, an indication of a predicted performance of the product with respect to at least one facet of the user experience;
tracking changes to the updated benchmark model; and
responsive to detecting changes to the updated benchmark model, generating, by the model, new predictions for the user experience under the updated benchmark model without running a test to directly measure benchmarks under the updated benchmark model.

11. The media of claim 10, wherein the instructions further cause:
receiving, by the model, feedback associated with said at least one prediction;
responsive to receiving the feedback, performing at least one update to at least one parameter of the model; and
generating, by the model based at least in part on said at least one update to said at least one parameter of the model, at least one additional prediction for the user experience associated with the product.

12. The media of claim 10, wherein the instructions further cause:
detecting a change in the target methodology; and
responsive to detecting the change in the target methodology, updating at least one parameter of the model.

13. The media of claim 10, wherein one or more of the first set of values are generated by running a user experience test according to the first methodology.

14. The media of claim 10, wherein the instructions further cause:
- determining that an input value to the model is missing;
- responsive to determining that the input value to the model is missing, inferring the input value based on one or more other input values to the model;
- wherein the first set of values includes the input value inferred from the one or more other input values to the model.

15. The media of claim 10,
- wherein the model is a neural network comprising a plurality of cells and connection weights between different cells of the plurality of cells;
- wherein the connection weights between different cells of the plurality of cells are determined based at least in part on relationship strengths between the facet tests in the target methodology and facet tests in said at least one source methodology.

16. The media of claim 10, wherein the indication identifies at least one facet that is predicted to underperform relative to a benchmark.

17. The media of claim 16, wherein the instructions further cause:
- executing an action based at least in part on said at least one facet that is predicted to underperform relative to the benchmark; wherein the action includes at least one of recommending or deploying an update to the product that is predicted to improve the user experience with respect to said at least one facet.

18. A system comprising:
- one or more hardware processors;
- one or more non-transitory computer-readable media storing instructions which, when executed by the one or more hardware processors cause:
  - receiving a first set of values that quantify a user experience associated with a product according to at least one source methodology;
  - generating, by a model based on the first set of values that quantify the user experience associated with the product according to said at least one source methodology, at least one prediction that quantifies the user experience associated with the product according to a target methodology, wherein the target methodology is different than said at least one source methodology, wherein the target methodology defines an updated benchmark model that modifies a benchmark model used by said at least one source methodology;
  - presenting, based on said at least one prediction for the user experience associated with the product according to the target methodology, an indication of a predicted performance of the product with respect to at least one facet of the user experiences;
  - tracking changes to the updated benchmark model; and
  - responsive to detecting changes to the updated benchmark model, generating, by the model, new predictions for the user experience under the updated benchmark model without running a test to directly measure benchmarks under the updated benchmark model.

19. The system of claim 18, wherein the instructions further cause:
- receiving, by the model, feedback associated with said at least one prediction;
- responsive to receiving the feedback, performing at least one update to at least one parameter of the model; and
- generating, by the model based at least in part on said at least one update to said at least one parameter of the model, at least one additional prediction for the user experience associated with the product.

20. The system of claim 18, wherein the instructions further cause:
- detecting a change in the target methodology; and
- responsive to detecting the change in the target methodology, updating at least one parameter of the model.

* * * * *